(12) United States Patent
Qin et al.

(10) Patent No.: US 10,629,871 B2
(45) Date of Patent: Apr. 21, 2020

(54) HOUSING OF BATTERY MODULE AND BATTERY MODULE

(71) Applicant: CONTEMPORARY AMPEREX TECHNOLOGY CO., LIMITED, Ningde (CN)

(72) Inventors: Feng Qin, Ningde (CN); Lin Ma, Ningde (CN); Jie Zhang, Ningde (CN); Zhiyi You, Ningde (CN); Juan Wang, Ningde (CN); Xinfu Xiao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 285 days.

(21) Appl. No.: 15/839,949

(22) Filed: Dec. 13, 2017

(65) Prior Publication Data
US 2018/0183023 A1 Jun. 28, 2018

(30) Foreign Application Priority Data
Dec. 27, 2016 (CN) .......................... 2016 1 1225113

(51) Int. Cl.
*H01M 2/02* (2006.01)
*H01M 2/10* (2006.01)
(Continued)

(52) U.S. Cl.
CPC ....... *H01M 2/1061* (2013.01); *H01M 2/0217* (2013.01); *H01M 2/1077* (2013.01);
(Continued)

(58) Field of Classification Search
None
See application file for complete search history.

(56) References Cited

U.S. PATENT DOCUMENTS

| 6,555,264 | B1 * | 4/2003 | Hamada | H01M 2/0245 429/149 |
| 2004/0170891 | A1 * | 9/2004 | Kajiya | H01M 2/021 429/160 |

(Continued)

OTHER PUBLICATIONS

Extended European Search Report from corresponding EP Application No. 17208129.1 completed on Jan. 19, 2018.
(Continued)

*Primary Examiner* — Jonathan Crepeau
(74) *Attorney, Agent, or Firm* — Tucker Ellis LLP (57) ABSTRACT

The present application relates to a housing of battery module and a battery module. The housing includes a lower shell, an upper cover and two output components, the lower shell includes a lower shell body and at least one connecting member; the lower shell body is separated into accommodating chambers for accommodating bare cell; an installation site for connecting member is provided in each accommodating chamber; every two adjacent accommodating chambers are provided with one connecting member between and penetrating through the every two adjacent accommodating chambers; an installation site for output component and an output hole are provided in each of a first one and a last one of the plurality of accommodation chambers; the two output components are sealedly connected with two output holes, respectively. The battery module includes bare cells and the housing.

15 Claims, 8 Drawing Sheets

(51) Int. Cl.
H01M 2/20 (2006.01)
H01M 2/24 (2006.01)
H01M 2/26 (2006.01)
H01M 2/36 (2006.01)
H01M 2/30 (2006.01)

(52) U.S. Cl.
CPC ............ *H01M 2/20* (2013.01); *H01M 2/202* (2013.01); *H01M 2/24* (2013.01); *H01M 2/263* (2013.01); *H01M 2/30* (2013.01); *H01M 2/36* (2013.01)

(56) References Cited

U.S. PATENT DOCUMENTS

| | | | |
|---|---|---|---|
| 2006/0166087 A1* | 7/2006 | Ogata | H01M 2/0242 |
| | | | 429/153 |
| 2008/0014499 A1 | 1/2008 | Ling | |
| 2016/0248052 A1 | 8/2016 | Minamitani | |

OTHER PUBLICATIONS

Office Action from corresponding European Application No. 17208129.1 dated Sep. 25, 2019.

* cited by examiner

HOUSING OF BATTERY MODULE AND BATTERY MODULE

CROSS-REFERENCE TO RELATED APPLICATIONS

The present application claims priority to Chinese Patent Application No. 201611225113.7, filed on Dec. 27, 2016, the content of which is incorporated herein by reference in its entirety.

TECHNICAL FIELD

The present application relates to the field of energy storage devices and, particularly, relates to a housing of a battery module and a battery module.

BACKGROUND

In the relevant art, a battery system can be classified into a battery package, a battery module and a bare cell in a sequence from a high system level to a low system level. In most of the battery modules produced by domestic and foreign manufacturers, the bare cell is the smallest unit, i.e., a cell is firstly produced, then, a corresponding protection device is provided and integrated in a lower shell body outside the cell to form a bare cell, and then a plurality of bare cells is assembled in parallel or in series to form a battery module.

However, such an assembling manner has various deficiencies, for example, both the lower shell body for the bare cell and the housing for the battery module are included, which leads to a great weight ratio of the mechanical structural members and a low energy density of the battery module.

SUMMARY

The present application provides a housing of a battery module and a battery module, which can solve the above-mentioned problems.

A first aspect of the present application provides a housing of a battery module, including a lower housing, a top cover and two output assemblies, wherein the lower housing includes a lower housing body and at least one connecting member;

the lower shell body is separated into a plurality of accommodating chambers for accommodating bare cells, the plurality of accommodating chambers is sequentially arranged along a hypothetical straight line, an opening is defined in each accommodating chamber at a same side, a plurality of injection holes communicating with external environment is defined in the lower shell body, and the plurality of injection holes corresponds to the plurality of accommodating chambers, respectively;

an installation site for connecting member is provided in each accommodating chamber, two installation sites for connecting member in two adjacent accommodation chambers are arranged opposite to each other, every two adjacent accommodating chambers are provided with one connecting member between and penetrating through the every two adjacent accommodating chambers, and the one connecting member is fixed on two installation sites for connecting member in the every two adjacent accommodating chambers, for connecting bare cells in the every two adjacent accommodating chambers in series;

an installation site for output component and an output hole are provided in each of a first one and a last one of the plurality of accommodation chambers; each output component is arranged on one installation site for output component, and extends out from the first one or the last one of the plurality of accommodation chambers through one output hole; the two output components are sealedly connected with two output holes, respectively;

the upper cover is capable of covering and matching with the lower shell body, and sealing all the openings.

Preferably, the installation site for output component and the installation site for connecting member are arranged along an arrangement direction of the plurality of accommodating chambers.

Preferably, the installation site for output component and the installation site for connecting member are arranged at a side of each accommodating chamber parallel to the arrangement direction of the plurality of accommodating chambers.

Preferably, each connecting member includes a first contact surface oriented toward the opening, and the first contact surface is used for connecting with the bare cells; and/or each output component includes a second contact surface oriented toward the opening, and the second contact surface is used for connecting with the bare cells.

Preferably, the installation site for connecting member includes a first boss, and the at least one connecting member is fixed on the first boss, and/or the installation site for output component includes a second boss, and each of the two output components is placed on the second boss, correspondingly.

Preferably, each output component includes a connection plate, an electrode terminal, a sealing member and a connecting block, the connection plate includes a connecting portion for bare cell and a connecting portion for electrode terminal, the connecting portion for bare cell is electrically connected with the connecting portion for electrode terminal, the connecting portion for bare cell is placed on the second boss, and the contact surface for output component is located on the connecting portion for bare cell, the electrode terminal is connected with the connecting portion for electrode terminal and extends out from a correspondingly accommodation chamber through the output hole, the electrode terminal seals the output hole by the sealing member, and the connecting block is connected with the electrode terminal from an outside of the lower shell body.

Preferably, both the connecting portion for bare cell and the connecting portion for electrode terminal are sheet-like and extend along the arrangement direction of the plurality of accommodating chambers, and a projection of the connecting portion for bare cell on a plane perpendicular to the arrangement direction of the plurality of accommodating chambers is perpendicular to a projection of the connecting portion for electrode terminal on a plane perpendicular to the arrangement direction of the plurality of accommodating chambers.

Preferably, a welding slot is defined in the electrode terminal, and the connecting portion for electrode terminal extends into the welding slot and is welded with the electrode terminal.

Preferably, the connection plate further includes a transition portion, the transition portion is sheet-like and extends along a direction perpendicular to the arrangement direction of the plurality of accommodating chambers, and the connecting portion for bare cell and the connecting portion for electrode terminal are respectively connected with the transition portion.

Preferably, a gap is defined between the second boss and the output hole, the connection plate further includes a bending portion, the connecting portion for bare cell is connected with the transition portion by the bending portion, and the bending portion is capable of being located in the gap when the connecting portion for bare cell is placed on the second boss.

Preferably, the connecting member is pre-embedded in the lower shell body.

Preferably, a welding boss is provided on a surface of the lower shell body coordinating with the upper cover.

Preferably, the upper cover includes a stop protrusion, and the stop protrusion is located at a side of the upper cover facing the plurality of accommodating chambers and is arranged along edges of the plurality of accommodating chambers.

A second aspect of the present application provides a battery module including a plurality of bare cells and the housing of a battery module as described above, each accommodating chamber accommodates at least one bare cell, and the at least one bare cell in each accommodation chamber is stacked and in parallel connection with each other, the at least one bare cell in one accommodation chamber is connected in series with the at least one bare cell in one adjacent accommodation chamber, and the two output components are connected with the at least one bare cell in the first one of the plurality of accommodating chambers and the at least one bare cell in the last one of the plurality of accommodating chambers, respectively.

Preferably, the battery module further includes a barrier film, both the lower housing body and the upper cover are made of plastics, and the barrier film warps a surface of the lower housing body and a surface of the upper cover.

The technical solutions provided by the present application have the following beneficial effects:

The battery module in the present application can be directly formed by the bare cells, which eliminates the mechanical structures such as the lower shell body outside the bare cells, therefore, the battery module can have improved energy density.

It should be understood that the general description above and the detailed description below are merely exemplary and cannot limit the present application.

REFERENCE SIGNS

1—housing of battery module;
10—lower shell;
100—lower shell body;
100a—accommodating chamber for bare cell;
100b—baffle plate;
100c—opening;
100d—injection hole;
100e—installation site for connecting member/first boss;
100f—installation site for output component/second boss;
100g—output hole;
100h—gap;
100i—welding boss;
102—connecting member;
102a—contact surface of connecting member;
12—upper cover;
120—stop protrusion;
14—output component;
140—connection plate;
140a—contact surface for output component;
140b—connecting portion for bare cell;
140c—connecting portion for electrode terminal;
140d—transition portion;
140e—bending portion;
142—electrode terminal;
142a—welding slot;
144—sealing member;
146—connecting block;
2—bare cell;
20—positive electrode tab;
22—negative electrode tab;
3—barrier film.

The drawings here are incorporated in the specification and form a part of the specification, which show embodiments of the present application and are used together with the specification to explain the principle of the present application.

DESCRIPTION OF EMBODIMENTS

The present application will be further illustrated in detail with reference to specific embodiments and the drawings. The expressions "front", "back", "left", "right", "top" and "bottom" mentioned in the present application are all referring to the placement state of the housing of battery module in the drawings.

Figure 1:
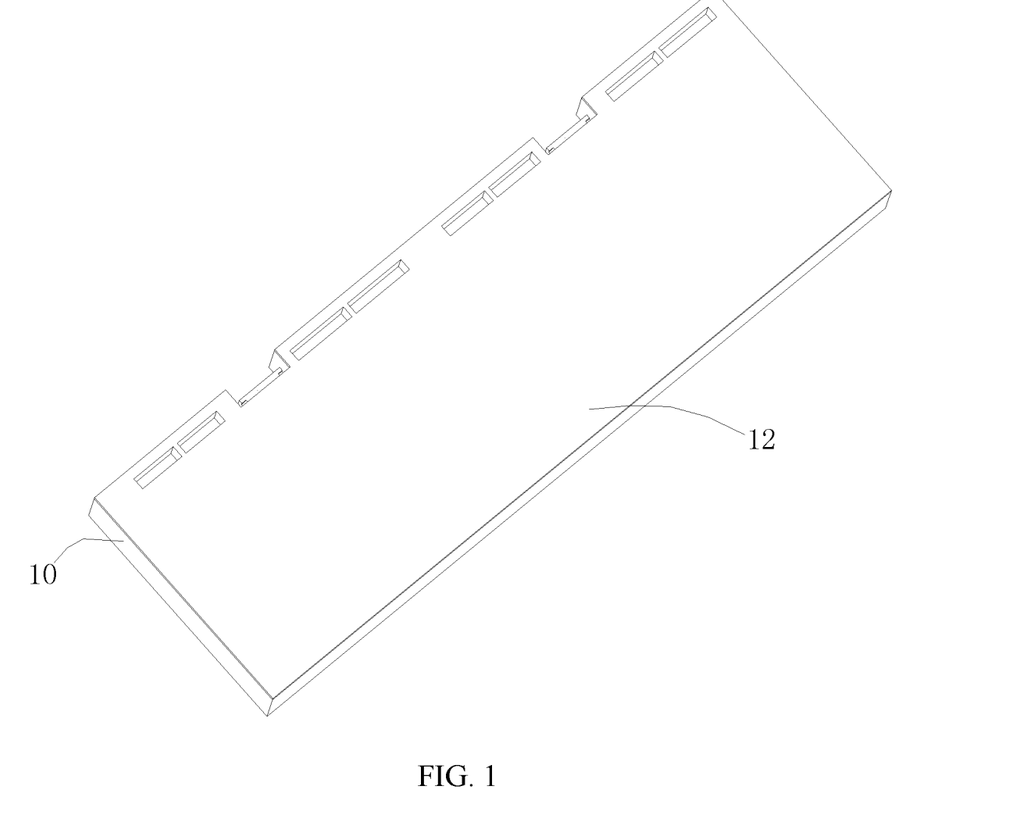
FIG. 1 is an overall structural schematic diagram of a battery module according to an embodiment of the present application.
Figure 2:
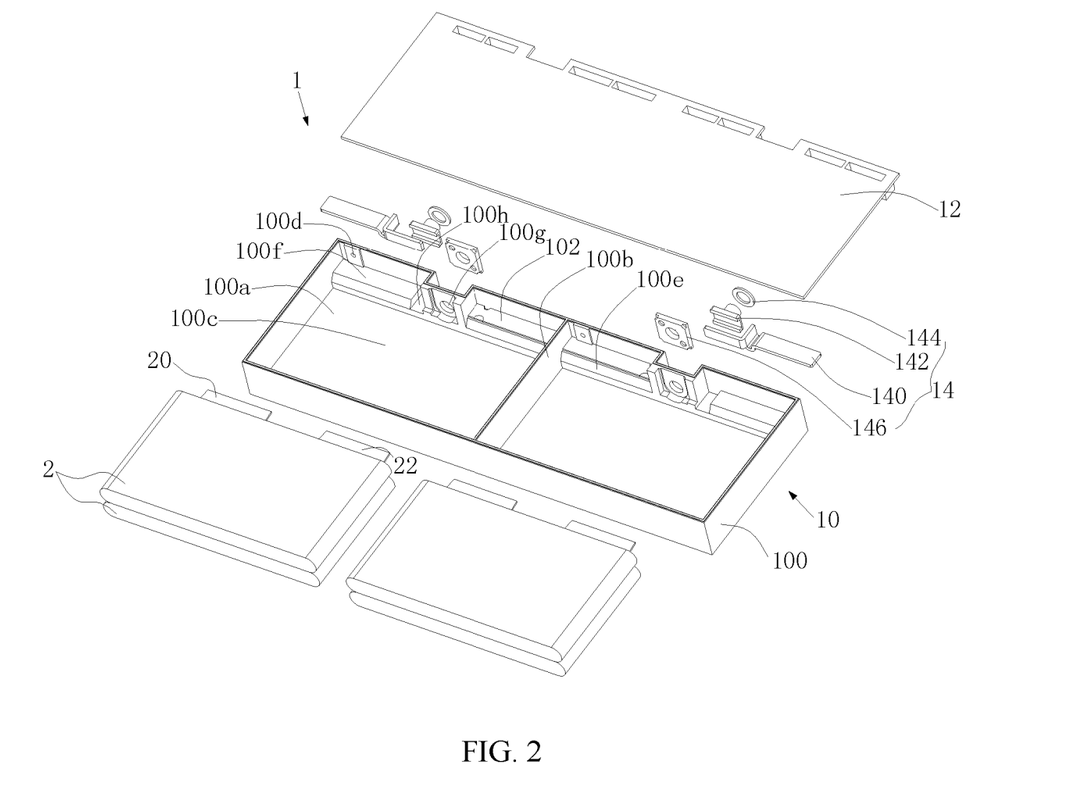
FIG. 2 is an exploded structural schematic diagram of a battery module according to an embodiment of the present application.

As shown in FIG. 1, an embodiment of the present application provides a battery module, including a housing 1 and a plurality of bare cells 2. The battery module may further include a barrier film 3 if necessary. The housing 1 is configured to accommodate the plurality of bare cells 2 and constitutes a protection shell of the battery module. As shown in FIG. 2, the housing 1 includes a lower shell 10, an upper cover 12 and an output component 14.

Figure 3:
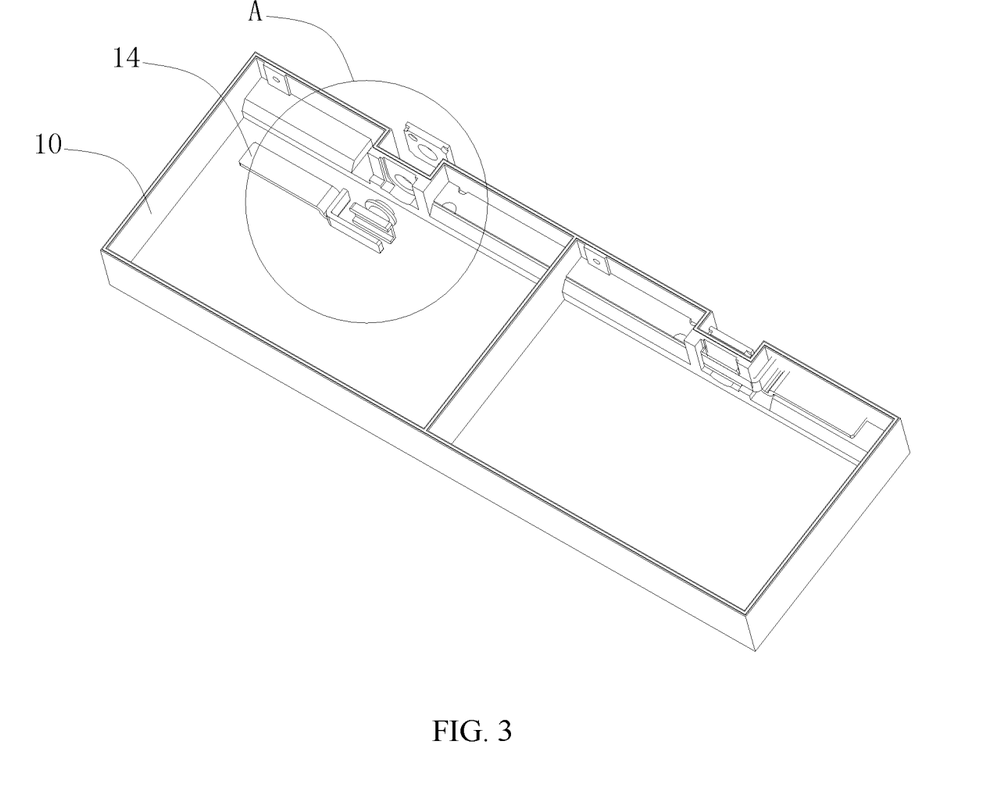
FIG. 3 is a schematic diagram of a lower shell and an output component before being assembled according to an embodiment of the present application.
Figure 5:
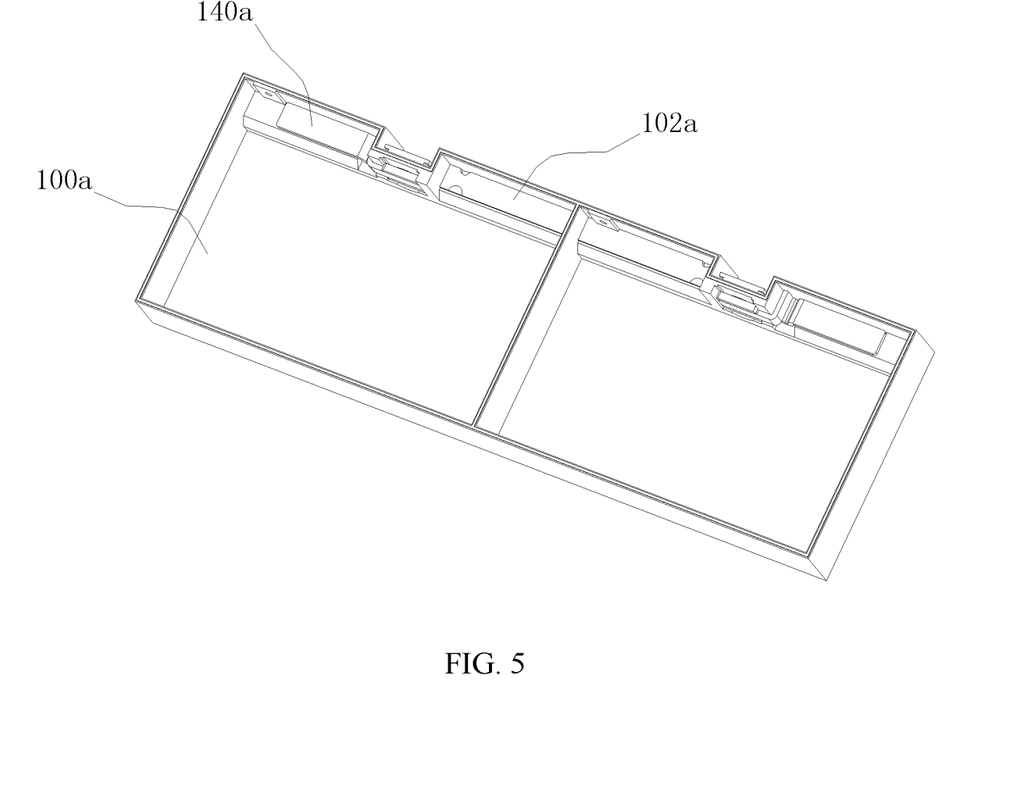
FIG. 5 is a schematic diagram of a lower shell and an output component after being assembled according to an embodiment of the present application.

The lower shell 10 includes a lower shell body 100 and a connecting member 102. The lower shell body 100 is a main structure of the lower shell 10 and is generally made as a whole of polypropylene (PP) or polybutylene terephthalate (PBT) materials by injection molding. A plurality of accommodating chambers 100a for accommodating the plurality of bare cells 2 are defined in the lower shell body 100. The number of the plurality of accommodating chambers 100a may be two or more. In FIG. 2, FIG. 3 and FIG. 5, the lower shell body 100 is separated into two accommodating chambers 100a. These accommodating chambers 100a are sequentially arranged along a hypothetical straight line, and each two adjacent accommodating chambers 100a are separated by a baffle plate 100b therebetween.

Each accommodating chamber 100a may accommodate only one bare cell 2, or may accommodate two or more bare cells 2. In an embodiment as shown in FIG. 2, each accommodating chamber 100a accommodates two bare cells 2. Each bare cell 2 generally includes two tabs, and the two tabs have opposite electric polarities, i.e., a positive electrode tab 20 and a negative electrode tab 22. These bare cells 2 placed in the same accommodating chamber 100a are stacked together with the positive electrode tabs 20 being connected with each other and with the negative electrode tab 22 being connected with each other, so as to form a parallel connection circuit.

In order to accommodate the bare cells 2 and other components, each accommodating chamber 100a is provided with an opening 100c at the same side, the accommodating chamber 100a is generally a cuboid structure of a flat shape and the opening 100c is defined in the largest surface of the accommodating chamber 100a, so as to facilitate the assembling of the bare cell 2 and other components. Besides, a plurality of injection holes 100d is defined in a plurality of positions of the lower shell body 100 corresponding to the plurality of accommodating chambers 100a, respectively. The plurality of injection holes 100d communicates with the external environment and is configured for injecting electrolyte into the plurality of accommodating chambers 100a, respectively.

The connecting member 102 is configured to connect the bare cells 2 in two adjacent accommodating chambers 100a in series, i.e., each two adjacent accommodating chambers 100a are provided with one connecting member 102 therebetween penetrating through the two adjacent accommodating chambers 100a. An installation site 100e for installing the connecting member 102 is provided in each accommodating chamber 100a, installation sites 100e in every two adjacent accommodating chambers 100a are opposite to each other, and the connecting member 102 is fixed on the installation sites 100e. In the embodiment as shown in FIG. 2, only two accommodating chambers 100a and one connecting member 102 are included. The negative electrode tabs 22 of all the bare cells 2 in the accommodating chamber 100a at the left side are connected with the connecting member 102, and the positive electrode tabs 20 of all the bare cells 2 in the accommodating chamber 100a at the right side are connected with the connecting member 102, so as to connect all the bare cells 2 in the two adjacent accommodating chambers 100a in series.

Generally, the positive electrode tabs 20 and the negative electrode tabs 22 are made of different materials, for example, the positive electrode tabs 20 are made of aluminum and the negative electrode tabs 22 are made of copper. Since the connecting member 102 is connected with both the positive electrode tabs 20 and the negative electrode tabs 22, good connection performance of the connecting member 102 with both of the two kinds of materials are necessary, thus, the connecting member 102 in the present embodiment is made of a copper-aluminum composite material.

In addition to that all the bare cells 2 in the battery module are electrically connected with each other, the battery module further includes a port to be electrically connected with an external device, and the electric energy of the bare cells 2 is transmitted out from the battery module through the port. In an embodiment, an installation site 100f for installing the output component 14 and an output hole 100g are provided in each of the first accommodating chamber 100a and the last accommodating chamber 100a. For example, in the embodiment including two accommodating chambers 100a, the two accommodating chambers 100a are the first accommodating chamber 100a and the last accommodating chamber 100a which are arranged in sequence. In an embodiment as shown in FIG. 3, two output components 14 are provided, and the two output components 14 are arranged on the installation site 100f for output component in the first accommodating chamber 100a and the installation site 100f for output component in the last accommodating chamber 100a, respectively. The output component 14 at the left side is connected with the positive electrode tabs 20 of the bare cells 2 in the accommodating chamber 100a at the left side, and the output component 14 at the right side is connected with the negative electrode tabs 22 of the bare cells 2 in the accommodating chamber 100a at the right side, so as to connect the two output components 14 in series at two ends of the connection circuit of these bare cells 2. The output component 14 further extends out from the accommodating chamber 100a through the output hole 100g, so as to transmit the electric energy out from the accommodating chamber 100a.

The positive electrode tab 20 and the negative electrode tab 22 of the bare cell 2 are generally classified into side-out type and up-out type, i.e., the positive electrode tab 20 and the negative electrode tab 22 are arranged at two sides of the bare cell 2, respectively; or both the positive electrode tab 20 and the negative electrode tab 22 are arranged at the top of the bare cell 2. Accordingly, the connecting member 102 and the output component 14 are arranged at corresponding positions in correspondence to a different battery module with a different type of electrode tabs. The battery module with the up-out type electrode tabs is advantageous over the battery module with the side-out type electrode tabs.

Figure 6:
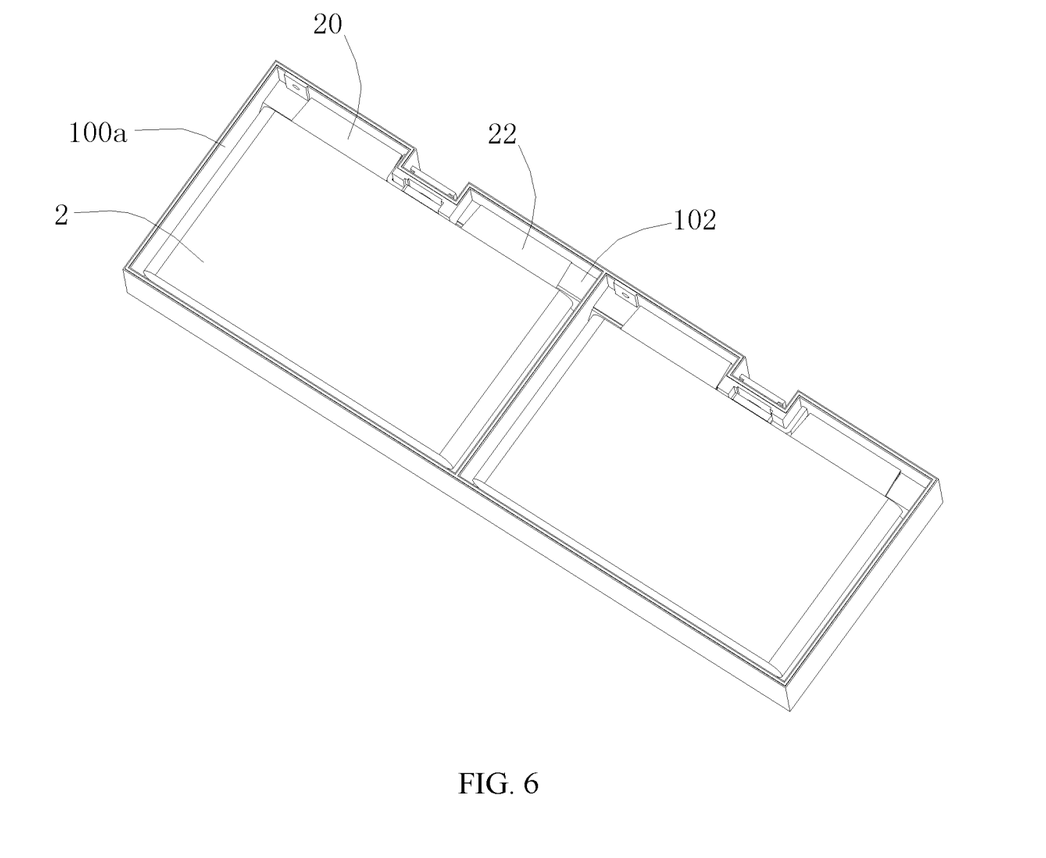
FIG. 6 is a schematic diagram of a lower shell and a bare cell after being assembled according to an embodiment of the present application.

As shown in FIG. 2 and FIG. 6, the bare cells 2 include up-out type electrode tabs, and all the positive electrode tabs 20 and the negative electrode tabs 22 extend from the same side of the bare cells 2, therefore, the electric connection components (i.e., the output components 14 and the connecting member 102) can be arranged at the same side of the accommodating chambers 100a. In an embodiment, the length direction of the bare cells 2 is identical to the arrangement direction of the accommodating chambers 100a, so that the positive electrode tabs 20 and the negative electrode tabs 22 of all the bare cells 2 are oriented toward the same side of the lower shell body 100. Accordingly, the installation sites 100f for output component and the installation sites 100e for connecting member can also be arranged along the arrangement direction of the accommodating chambers 100a, so that the lower shell body 100 can have higher structural uniformity.

In order to save internal space of the accommodating chamber 100a, the installation site 100e for connecting member and the installation site 100f for output component may be arranged at a side of the accommodating chamber 100a parallel to the arrangement direction of the accommodating chambers 100a, and closely attached to an inner wall of the accommodating chamber 100a.

As shown in FIG. 5, when the length direction of the bare cells 2 placed in the accommodating chambers 100*a* is identical to the arrangement direction of the accommodating chambers 100*a*, the extending direction of the positive electrode tabs 20 and the extending direction of the negative electrode tabs 22 are generally identical to the opening direction of the opening 100*c*, that is, main planes of the positive electrode tabs 20 and the negative electrode tabs 22 are oriented toward the opening 100*c*. Thus, in order to facilitate the connection of the connecting member 102 with the positive electrode tabs 20 and the negative electrode tabs 22, it is preferred that the connecting member 102 has a contact surface 102*a* facing the opening 100*c*, so that the electrode tabs do not need to be bended and thus the spaced occupied will be saved, which can further facilitate welding operation.

It is also preferred that the output component 14 includes a contact surface 140*a* for output component, so as to achieve the same effect as the contact surface 102*a*.

The connecting member 102 may be a sheet-like, triangular prism-like, cubic or other more complicated structures, as long as the connecting member 102 can have one contact surface 102*a*, however, the sheet-like structure is simpler and more space-saving as compared with other structures.

In an embodiment, during the forming of the lower shell body 100, the connecting member 102 may be pre-embedded at a corresponding position in the lower shell body 100, and then integrated as whole by injection molding and the like, so as to eliminate the installation procedure of the connecting member 102.

The bare cell 2 has a certain thickness, and the positive electrode tab 20 and the negative electrode tab 22 are generally located close to the middle of the thickness surface of the bare cell 2; if the contact surface 102*a* is too close to the edge of the bare cell 2 or directly arranged on the inner wall of the accommodating chamber 100*a* facing the opening 100*c*, the electrode tabs will be too far to be connected with the contact surface 102*a*. In view of this, as shown in FIG. 2, the installation site 100*e* for connecting member may include a first boss (for convenience for referring to the drawings, the first boss is still referred as 100*e* in the following description), the output component 14 is placed on the first boss 100*e*, so that the contact surface 102*a* can be closer to the electrode tabs, so as to reduce the connection difficulties.

Similarly, the installation site 100*f* for output component may also include a second boss (for convenience for referring to the drawings, the second boss is still referred as 100*f* in the following description), and the second boss 100*f* plays a similar role as the first boss 100*e*, and thus the contact surface 140*a* for output component can be closer to the electrode tabs.

Figure 4:
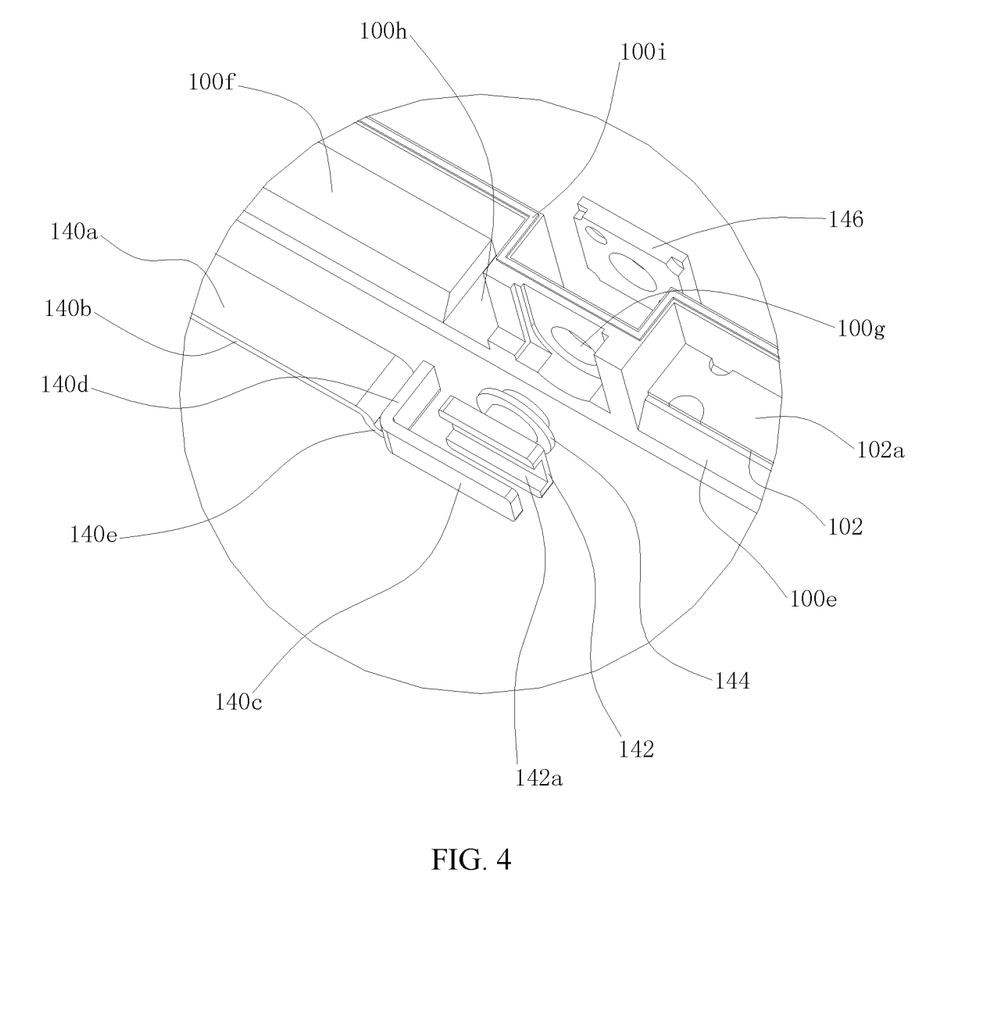
FIG. 4 is a partial enlarged schematic diagram of section A in FIG. 3.

The structure of the output component 14 is described in details as follows. As shown in FIG. 2, the output component 14 includes a connection plate 140, an electrode terminal 142, a sealing member 144 and a connecting block 146. As shown in FIG. 4, the connection plate 140 includes a connecting portion 140*b* for bare cell, a connecting portion 140*c* for electrode terminal, a transition portion 140*d* and a bending portion 140*e*, and the connecting portion 140*b* for bare cell is electrically connected with the connecting portion 140*c* for electrode terminal. The connecting portion 140*b* for bare cell may be a sheet-like structure, a flat surface of the connecting portion 140*b* for bare cell is attached to the second boss 100*f* and another flat surface of the connecting portion 140*b* for bare cell serves as the contact surface 140*a* for output component.

The connecting portion 140*c* for electrode terminal is configured to be connected with the electrode terminal 142, the electrode terminal 142 after being connected with the connecting portion 140*c* for electrode terminal extends out from the accommodating chamber 100*a* through the output hole 100*g*, so as to transmit electric energy out of the accommodating chamber 100*a*. In order to sufficiently utilize the space, the connecting portion 140*c* for electrode terminal may also be a sheet-like structure, both the connecting portion 140*b* for bare cell and the connecting portion 140*c* for electrode terminal extend along the arrangement direction of the accommodating chambers 100*a*, an projection of the connecting portion 140*b* for bare cell in a plane perpendicular to the arrangement direction is perpendicular to a projection of the connecting portion 140*c* for electrode terminal in the plane perpendicular to the arrangement direction, that is, the connecting portion 140*b* for bare cell is oriented toward the opening 100*c*, and the connecting portion 140*c* for electrode terminal is oriented toward an inner wall of the accommodating chamber 100*a* parallel to the arrangement direction of the accommodating chambers 100*a*. Thus, the connection area of the connecting portion 140*b* for bare cell and the connection area of the connecting portion 140*c* for electrode terminal can be staggered at 90 degrees, so as to reduce interference risk and realize the sufficient utilization of space.

In order to enhance the connection strength between the connecting portion 140*c* for electrode terminal and the electrode terminal 142, a welding slot 142*a* may be defined in the electrode terminal 142, the connecting portion 140*c* for electrode terminal is inserted in the welding slot 142*a* and is welded with the electrode terminal 142. It is preferred that the outer surface of the connecting portion 140*c* for electrode terminal is fitted to the inner surface of the welding slot 142*a*, so as to improve the welding effect.

The extending direction of the connecting portion 140*b* for bare cell is opposite to the extending direction of the connecting portion 140*c* for electrode terminal, and the projection of the connecting portion 140*b* for bare cell on a plane perpendicular to the arrangement direction of the accommodating chambers 100*a* is perpendicular to the projection of the connecting portion 140*c* for electrode terminal on the plane perpendicular to the arrangement direction of the accommodating chambers 100*a*, thus, if the direct connection between the connecting portion 140*b* for bare cell and the connecting portion 140*c* for electrode terminal merely adopts a cross connection or an angular connection, the connection area is small and the connection is insecure and is also inconvenient for processing. Therefore, the connection may be achieved by means of the transition portion 140*d*. The transition portion 140*d* is a sheet-like structure, and the extending direction of the transition portion 140*d* is perpendicular to the arrangement direction of the accommodating chambers 100*a*, i.e., parallel to the baffle plate 100*b*. Accordingly, both the connecting portion 140*b* for bare cell and the connecting portion 140*c* for electrode terminal are perpendicular to the transition portion 140*d*, therefore, both the connecting portion 140*b* for bare cell and the connecting portion 140*c* for electrode terminal can be perpendicularly connected with the transition portion 140*d*. Or, the connection relation of the connecting portion 140*b* for bare cell, the connecting portion 140*c* for electrode terminal and the transition portion 140*d* can be achieved by means of an electrical conductive sheet by directly trimming and bending.

In an embodiment, the output component 14 is not pre-embedded into the lower shell body 100 as the output component 14 is required to connect the interior of the accommodating chamber 100a with the exterior of the accommodating chamber 100a. However, the embedding-injection molding manner cannot guarantee the sealing performance, therefore, the installation is achieved by an assembling manner. However, the installation by the assembling manner may have a certain deviation. In order to eliminate influence of the deviation on the assembling, a certain gap 100h is defined between the second boss 100f and the output hole 100g, and a bending portion 140e is formed between the connecting portion 140b for bare cell and the transition portion 140d of the adaptor 140. The bending portion 140e is configured to adjust the angle between the connecting portion 140b for bare cell and the transition portion 140d and the positions of the connecting portion 140b for bare cell and the transition portion 140d, so as to eliminate the deviation. The gap 100h is configured to accommodate the bending portion 140e. Further, the bending portion 140e after being accommodated in the gap 100h can also play a role of clamping and thus limiting the movement of the connecting portion 140b for bare cell.

Since the accommodating chamber 100a is required to be injected with electrolyte, the output component 14 shall be sealedly connected with the output hole 100g to prevent leakage of the electrolyte. For example, the electrode terminal 142 seals the output hole 100g through a sealing member 144 (e.g., a sealing ring), and a portion of the electrode terminal 142 extending out of the output hole 100g is connected with the connecting block 146 by welding or riveting.

Figure 7:
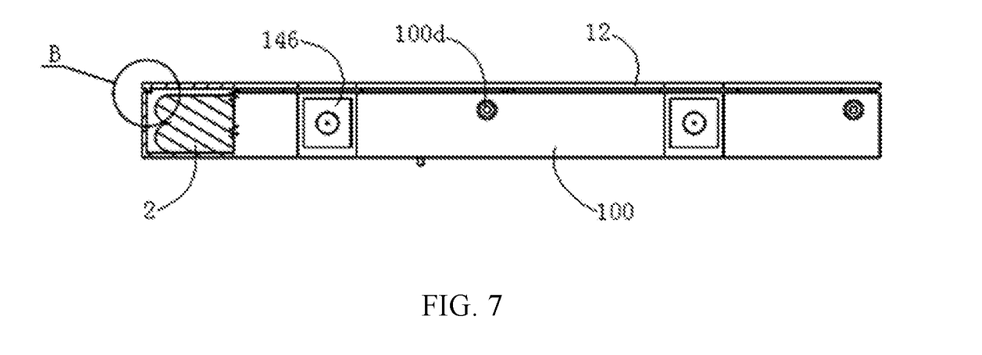
FIG. 7 is a partial sectional view of a battery module according to an embodiment of the present application.
Figure 8:
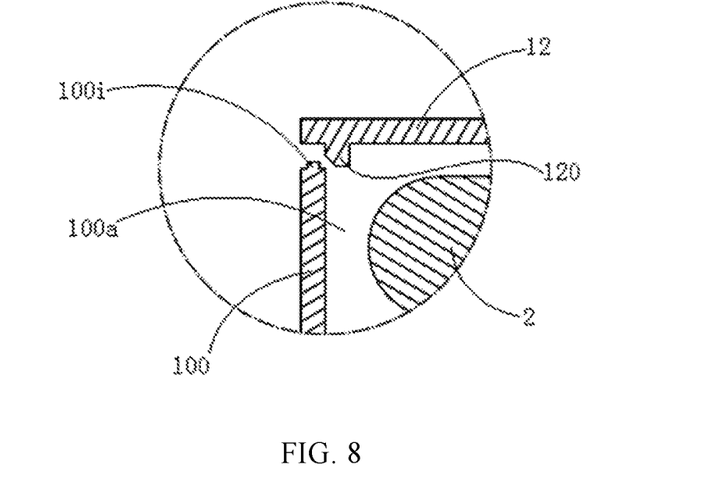
FIG. 8 is a partial enlarged schematic diagram of section B in FIG. 6.

When the placement and corresponding connection and fixation of the bare cells 2 and the output components 14 are finished, the upper cover 12 covers the lower shell body 100 and is connected with the lower shell 100 by laser welding or other manners, so as to seal all the openings 100c. As shown in FIGS. 4, 7 and 8, in order to improve the sealing performance, a welding boss 100i may be provided on a surface of the lower shell body 100 coordinating with the upper cover 12, and the welding boss 100i is configured to melt and solidify during welding and then the welding is finished.

In order to prevent overflowing toward the interior of the accommodating chamber 100a during welding, as shown in FIG. 8, a stop protrusion 120 may be provided at a suitable position on the upper cover 12, the stop protrusion 120 is located at side of the upper cover 12 facing the accommodating chamber 100a, and the stop protrusion 120 is arranged along the edge of the accommodating chambers 100a.

The assembling of the battery module is basically finished after the bare cells 2 are packaged into the housing 1 of battery module and the lower shell body 100 is welded and sealed with the upper cover 12. During use, the lower shell body 100 and the upper cover 12 define a closed and sealed interior of the battery module. However, the electric vehicles need to be lightweight, and the housings for the electric vehicles also need to be lightweight accordingly. Therefore, it is a developing trend to use a plastic material which is resistant against corrosion of electrolyte as the materials of the lower shell body 100 and the upper cover 12. For examples, suitable choice of the plastic material may include: general plastics such as polyethylene, polypropylene, polyvinyl chloride, polystyrene, ABS (acrylic acid-butadiene-styrene), polymethyl benzoic acid methyl ester and amino plastics; or general engineering plastics such as polyamide, polycarbonate, polyformaldehyde, polyphenylene oxide and thermoplastic polyesters; or special engineering plastics such as polyimide, polyphenylene sulfide, polysulfone, aromatic polyamide, polyarylester, polyphenyl ester, poly (aryl ether ketone), liquid crystalline polymer and fluorine resin.

However, the lower shell body 100 and upper cover 12 made of plastics have low compactness, and readily age with time, the polymer molecular chains have increasing porosity and increasing permeability of water and oxygen molecules, which influences the inner property of the bare cells, especially the cycle performance of the bare cells.

Therefore, in order to extend service life, a barrier film 3 may wrap the outer surface of each of the lower shell body 100 and the upper cover 12. The barrier film 3 shall be made of a material with water vapor transmission coefficient less than 0.5 g/[m$^2$*24 h], e.g., aluminum-plastic composite film material, plastics with evaporation plating/deposition composite material on surface or plastic film material with super-high molecular weight.

Figure 9:
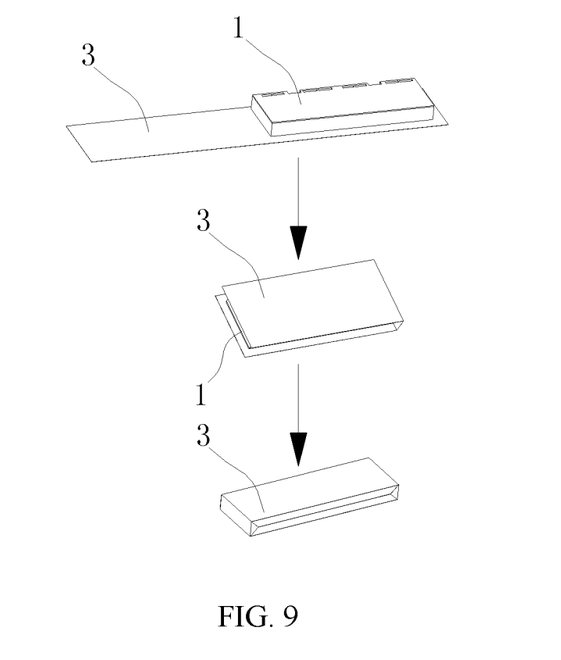
FIG. 9 is a schematic diagram showing wrapping of a barrier film on a battery module according to an embodiment of the present application.

According to the actual application demands on the materials of the barrier film 3 and the battery module, there may be one layer of barrier film 3, two layers of barrier films 3, or more than two layers of barrier films 3 wrapping the lower shell body 100 and the upper cover 12. The barrier film 3 can be separately arranged according to the position to be wrapped. The barrier film 3 can be folded to wrap a plurality of surfaces of both the lower shell body 100 and the upper cover 12 (shown in FIG. 9), or be attached to the outer surfaces of the lower shell body 100 and the upper cover 12 by adhering, welding or laminating.

The battery module in the present application is formed by directly using the bare cells, which eliminates the mechanical structures like the lower shell outside the bare cell, therefore, the battery module can have improved energy density.

The above-mentioned are merely the preferred embodiments of the present application, which are not used to limit the present application. For the person skilled in the art, the present application can have a variety of modifications and changes. Whatever in the spirit and principle of the present application. All modifications, equivalent substitutions and improvement based on the present application shall all be included in the protection scope of the present application.

What is claimed is:
1. A housing of a battery module, comprising a lower shell, an upper cover and two output components, wherein the lower shell comprises a lower shell body and at least one connecting member;
   the lower shell body is separated into a plurality of accommodating chambers for accommodating bare cells, the plurality of accommodating chambers is sequentially arranged along a hypothetical straight line, an opening is defined in each accommodating chamber at a same side, a plurality of injection holes communicating with external environment is defined in the lower shell body, and the plurality of injection holes corresponds to the plurality of accommodating chambers, respectively;
   an installation site for connecting member is provided in each accommodating chamber, two installation sites for connecting member in two adjacent accommodation chambers are arranged opposite to each other, every two adjacent accommodating chambers are provided with one connecting member between and penetrating through the every two adjacent accommodating chambers, and the one connecting member is fixed on two installation sites for connecting member in the every two adjacent accommodating chambers, for connecting bare cells in the every two adjacent accommodating chambers in series;

an installation site for output component and an output hole are provided in each of a first one and a last one of the plurality of accommodation chambers; each output component is arranged on one installation site for output component, and extends out from the first one or the last one of the plurality of accommodation chambers through one output hole; the two output components are sealedly connected with two output holes, respectively;

the upper cover is capable of covering and matching with the lower shell body, and sealing all the openings;

the installation site for connecting member comprises a first boss, and the at least one connecting member is fixed on the first boss, and/or the installation site for output component comprises a second boss, and each of the two output components is placed on the second boss, correspondingly.

2. The housing of a battery module according to claim 1, wherein the installation site for output component and the installation site for connecting member are arranged along an arrangement direction of the plurality of accommodating chambers.

3. The housing of a battery module according to claim 2, wherein the installation site for output component and the installation site for connecting member are arranged at a side of each accommodating chamber parallel to the arrangement direction of the plurality of accommodating chambers.

4. The housing of a battery module according to claim 3, wherein each connecting member comprises a first contact surface oriented toward the opening, and the first contact surface is used for connecting with the bare cells; and/or each output component comprises a second contact surface oriented toward the opening, and the second contact surface is used for connecting with the bare cells.

5. The housing of a battery module according to claim 4, wherein each output component comprises a connection plate, an electrode terminal, a sealing member and a connecting block, the connection plate comprises a connecting portion for bare cell and a connecting portion for electrode terminal, the connecting portion for bare cell is electrically connected with the connecting portion for electrode terminal, the connecting portion for bare cell is placed on the second boss, and the contact surface for output component is located on the connecting portion for bare cell, the electrode terminal is connected with the connecting portion for electrode terminal and extends out from a corresponding accommodation chamber through the output hole, the electrode terminal seals the output hole by the sealing member, and the connecting block is connected with the electrode terminal from an outside of the lower shell body.

6. The housing of a battery module according to claim 5, wherein both the connecting portion for bare cell and the connecting portion for electrode terminal are sheet-like and extend along the arrangement direction of the plurality of accommodating chambers, and an orthographic projection of the connecting portion for bare cell on a plane perpendicular to the arrangement direction of the plurality of accommodating chambers is perpendicular to an orthographic projection of the connecting portion for electrode terminal on a plane perpendicular to the arrangement direction of the plurality of accommodating chambers.

7. The housing of a battery module according to claim 6, wherein a welding slot is defined in the electrode terminal, and the connecting portion for electrode terminal extends into the welding slot and is welded with the electrode terminal.

8. The housing of a battery module according to claim 6, wherein the connection plate further comprises a transition portion, the transition portion is sheet-like and extends along a direction perpendicular to the arrangement direction of the plurality of accommodating chambers, and the connecting portion for bare cell and the connecting portion for electrode terminal are respectively connected with the transition portion.

9. The housing of a battery module according to claim 8, wherein a gap is defined between the second boss and the output hole, the connection plate further comprises a bending portion, the connecting portion for bare cell is connected with the transition portion by the bending portion, and the bending portion is capable of being located in the gap when the connecting portion for bare cell is placed on the second boss.

10. The housing of a battery module according to claim 1, wherein the connecting member is pre-embedded in the lower shell body.

11. The housing of a battery module according to claim 1, wherein a welding boss is provided on a surface of the lower shell body coordinating with the upper cover.

12. The housing of a battery module according to claim 1, wherein the upper cover comprises a stop protrusion, and the stop protrusion is located at a side of the upper cover facing the plurality of accommodating chambers and is arranged along edges of the plurality of accommodating chambers.

13. A battery module, comprising a plurality of bare cells and the housing of a battery module according to claim 1, wherein each accommodating chamber accommodates at least one bare cell, the at least one bare cell in one accommodation chamber is connected in series with the at least one bare cell in one adjacent accommodation chamber, and the two output components are connected with the at least one bare cell in the first one of the plurality of accommodating chambers and the at least one bare cell in the last one of the plurality of accommodating chambers, respectively.

14. The battery module according to claim 13, further comprising a barrier film, wherein both the lower shell body and the upper cover are made of plastics, and the barrier film wraps a surface of the lower shell body and a surface of the upper cover.

15. The battery module according to claim 13, wherein the at least one bare cell in each accommodation chamber comprises two or more bare cells, and the two or more bare cells are stacked and in parallel connection with each other.

* * * * *